United States Patent Office 3,003,947
Patented Oct. 10, 1961

3,003,947
SEPARATION OF ASPHALT-TYPE BITUMINOUS MATERIALS UTILIZING ALIPHATIC CARBOXYLIC ACID ESTERS CONTAINING 2 THROUGH 3 CARBON ATOMS
Leo Garwin, Oklahoma City, Okla., assignor to Kerr-McGee Oil Industries, Inc., a corporation of Delaware
No Drawing. Filed Mar. 11, 1959, Ser. No. 798,611
17 Claims. (Cl. 208—45)

The present invention relates to a process for separating an asphalt-type bituminous material into two or more fractions. More particularly, the present invention relates to an improved process for separating an asphalt-type bituminous material into at least two fractions at a greatly improved rate of separation by use of one or a mixture of selective solvents.

This application is a continuation-in-part of my application Serial No. 435,353, filed June 8, 1954, for "Separation of Asphalt-Type Bituminous Materials," now abandoned.

The term "asphalt-type bituminous material" as used in the specification and claims is intended to include pyrogenous and naturally occuring asphalts (bitumens and pyrobitumens), one or more fractions or components thereof including asphaltenes, or products obtained by blowing or otherwise treating these materials or one or more of their components or fractions with air or another oxygen-containing gas in the presence or absence of catalysts. Examples of naturally occurring asphalts include low gravity asphaltic crudes, gilsonite, graphamite, wurtzilite, albertite, elaterite and native asphalts, such as Trinidad asphalt. Examples of pyrogenous asphalts include vacuum or steam reduced crudes and pressure or cracked tars. Blown asphalt-type bituminous material include those blown either in the presence or absence of catalysts such as phosphorous pentoxide, ferric chloride, cobaltic salts, etc. The term "one or more fractions or components thereof" is intended to include an asphalt-type bituminous material from which a portion or the total asphaltene content has been removed, for example, by the method described in copending application Serial Number 218,480, filed March 30, 1951, now U.S. Patent No. 2,783,188, or an asphalt-type bituminous material from which the asphaltenes as well as a portion of the resin content has been removed by, for example, the same method. The term "otherwise treating" is intended to include condensation of asphalt-type bituminous material in the presence of a suitable treating agent to produce heavier or more complex materials of a bituminous nature. Examples of suitable treating agents are catalysts of the Friedel-Crafts type, or those disclosed by Hersberger in United States Patent Number 2,247,375.

Since asphalt-type bituminous materials are highly complex mixtures of a very large number of compounds covering a wide range of structures and molecular weights, it is customary to characterize their composition by solubility in definite amounts of arbitrarily selected solvents. Thus, when, for example, such a material is thoroughly mixed at room temperature with a paraffin hydrocarbon solvent containing from four to eight carbon atoms, inclusive, and certain other solvents, the undissolved portion settling out as solids is classified ordinarily as "asphaltenes" and the soluble portion as "a mixture of resins and oils" or as "petrolenes." Since the amount of material that settles out varies somewhat with each of these solvents, the undissolved portion is sometimes more specifically designated as "normal pentane asphaltenes," "isopentane asphaltenes," etc.

As a rule, the average molecular weight and structural complexity increase from the oily to the resinous fraction and finally to the undissolved fraction or asphaltenes.

Generally, these three fractions or categories differ in their physical and chemical behavior. However, it is believed that there are individual members of each group which are borderline cases and which may fall into one fraction or category or another depending upon the treatment used, e.g., the kind and amount of solvent. Hence, from the foregoing discussion of the nature of asphalt-type bituminous materials, it will be appreciated that the terms "asphaltenes," "resins" and "oils," as applied to asphalt-type bituminous materials refer to broad classes or categories of the constituents of asphalt-type bituminous materials, the exact composition being dependent upon the particular asphalt-type bituminous material from which they were derived, the agents, such as solvents, employed for separating these fractions from each other, the conditions including solvent volume and temperature employed for carrying out the separation, and a number of other factors. Nevertheless, these terms provide a convenient means for those skilled in the art to refer to broad classes of the constituents of asphalt-type bituminous materials which do possess varied chemical and physical properties even though, for example, an asphaltene may contain some constituents which are the same as those occurring in the resins.

Each of the fractions or categories into which asphalt-type bituminous materials may be separated is useful for purposes for which the parent material is not suitable or when used for the same purpose, gives results which are new and useful. Thus, when the parent material is steam or vacuum-reduced asphalt, the oils have lubricating properties, the resins are useful in coating compositions and as extenders in plastics manufacture and the asphaltenes are useful as rubber extenders and in coating compositions. Also, the resins, oils and asphaltenes may be used singly or in combination as additives to modify the properties of asphalt-type bituminous materials.

Application Serial No. 218,480, filed March 30, 1951, now United States Patent No. 2,783,188, describes a method of separating asphalt-type bituminous materials into three fractions or categories, namely, the asphaltenes, the resins and the oils. In accordance with this method, the asphaltenes are separated from the resin-oil mixture or petrolene content by treating the asphalt charge with normal pentane or a similar solvent under ambient temperature conditions and allowing the asphaltenes to settle out. Asphaltenes separated in this manner settle out very slowly due to the flocculent nature of the asphaltene particles. Asphaltene floc is very light and coarse and consequently the asphaltenes settle out only when several small floc particles combine through physical contact to form a larger particle. Asphaltenes from blown asphalts are particularly difficult to handle. They frequently settle out at one-tenth or one-twentieth of the rate exhibited by asphaltenes from vacuum-reduced asphalts. Many attempts have been made to improve the settling rate of the asphaltenes. All of these attempts have resulted in methods possessing notable disadvantages. The more important methods used to improve the settling rate of asphaltenes and a discussion of the disadvantages of these methods may be summarized as follows:

(a) Centrifuging of the asphaltene suspension is satisfactory insofar as the physical separation obtained is concerned. However, the equipment in which the centrifuging is carried out is quite costly and the operating charges are high.

(b) Filtration methods have not been too successful. Due to the compressible nature of the floc, the pressure under which filtration may be carried out must be low to avoid compaction and plugging of the filter. The overall filtration rate is consequently low. Filter aids have been used, both as precoats and as part of the mixture, to increase the filtration rate. Improvement of the filtration rate has been achieved by this, but the addition of a filter aid increases the cost and creates a subsequent problem of removing the filter aid from the finished asphaltene product.

(c) Gravity settling has a number of disadvantages and because of the low settling rate under ordinary conditions of temperature and pressure, expensive thickeners are required. The settling rate can be improved significantly by raising the temperature of settling, the upper temperature limit being the boiling point of the solvent. Even below the boiling point, convection currents may be serious. Furthermore, should the settled solid floc be allowed by accident or plant shut-down to stand in the settler without agitation and removal, it would compact and the degree of compaction would be so great that after a twenty-four hour period it would be necessary to remove the solids by hand or by mechanical means.

Another serious disadvantage connected with the conventional separation of asphaltenes in the gravity settler results from the fact that the asphaltenes cannot be removed continuously from the bottom of the thickener in dry form. It is necessary to incorporate enough liquid to provide the necessary fluidity for pumpability. In most cases, at least one or two volumes of liquid are required per volume of solid to give a pumpable slurry. Under such conditions, contamination of the asphaltene fraction by the resin and oils dissolved in the liquid removed along with the solid is inevitable. Multiple-countercurrent thickening and washing would eliminate this, but the cost is practically prohibitive.

Accordingly, it is a principal object of the present invention to provide an improved method for separating an asphalt-type material into at least two fractions.

It is a further object of the present invention to provide an improved method for separating the asphaltene fraction or a portion thereof from an asphalt-type material in a manner which eliminates the difficulties of low settling rate obtained when separating asphaltenes in the conventional manner.

A further object of the present invention is to provide an improved method for separating the asphaltene fraction or a portion thereof from an asphalt-type material in a manner permitting continuous operation to be used instead of the usual batch process techniques.

These and other objects of the present invention will become more apparent upon considering the following description of the present invention.

The present invention resides in the discovery that at least two fractions of an asphalt-type bituminous material may be obtained, one of them being in the liquid phase and the other being dissolved in the solvent when certain solvents are employed in certain volume ratios at specific elevated temperature and pressure conditions. Since the insoluble fraction may be separated from the asphalt-type bituminous material in liquid phase and this separation occurs rapidly, the process lends itself to continuous operation.

In accordance with the present invention, included among the satisfactory solvents are esters containing a total of 2 to 3 carbon atoms, inclusive, and admixtures of the same. By the term "admixtures of the same" as used in this specification including the claims is meant a mixture of these solvents, such as methyl formate and methyl acetate or mixtures of esters having an average composite molecular weight falling within that of the 2 to 3 carbon atom esters such as, for example, a mixture of esters having 2 and 4 carbon atoms in proportions so that the resulting mixture has an apparent density and properties for purposes of the invention similar to those of a 2 to 3 carbon atom ester or mixture thereof.

The selection of the volume ratio of solvent to asphalt-type bituminous material is, in accordance with the present invention, critical insofar as there is a minimum solvent to asphalt-type bituminous material volume ratio which is about 2:1. Where solvent to asphalt-type bituminous material volume ratios are less than 2:1, complete miscibility of the solvent and asphalt-type bituminous material is obtained and separation of the bituminous material becomes impossible. Increase of the volume ratio of solvent to asphalt-type bituminous material from about 2:1 to about 10:1 may increase, decrease or leave unchanged the percent yield of asphaltene depending on the asphaltic-type material being treated, the solvent being used and the temperature and pressure being used. As the volume ratio is increased above this latter value, the percentage yield does not appear to change significantly. A volume ratio of solvent to asphalt-type bituminous material of at least about 4:1 is generally preferred. The selection of the volume ratio up to a value of 10:1 is determinative to some extent of the percentage yield of asphaltenes obtained and consequently offers measures for varying the properties of the asphaltene fraction. Using volume ratios above this latter value does not result in a change in yield and consequently use of these higher volume ratios is of no particular operational advantage but does offer economic as well as operational disadvantages.

In accordance with the present invention, I have discovered that the temperature employed must exceed 200° F. in order to obtain a separation of a fraction which is in the liquid phase and freely flowable from the treating vessel. In other words, it its necessary to operate at or above this temperature in order for a bulk interface to form between the separated fraction and the solvent solution of residual asphalt-type material. At temperatures below this level each of the solvents or admixtures of the same cause the precipitation of a fraction, but this fraction is either semi-solid or solid and frequently causes plugging of the treating vessel.

The maximum temperature of operation for the purpose of separating a liquid phase fraction comprising the total asphaltenes of the asphalt-type bituminous material treated is approximately 50° F. below the critical temperature of the particular solvent employed. At values just above this temperature, the density change of the solvent is so rapid that not only does an asphaltene fraction separate in liquid phase, but a portion of the resin content of the asphalt-type bituminous material begins to separate.

Selection of an operating temperature between 200° F. and about 50° F. below the critical temperature of the particular solvent employed provides a convenient means for separating different fractions from the asphalt-type bituminous material. This is a particularly important feature of the present invention since it provides a method for obtaining different yields from a particular asphalt-type bituminous material. Variation in the yield results in fractions possessing different physical and chemical properties.

When operating withing the aforesaid range of temperature for obtaining a liquid phase asphaltene fraction or a plurality of such fractions, it is of course essential that the pressure employed be not less than the equilibrium vapor pressure of the solvent at its temperature. Higher pressures may, however, be employed. Utilization of these higher pressures, however, does not have any great effect upon the percentage yield of asphaltenes. In other words, the percentage yield is primarily a function of temperature.

Solvents such as methyl formate, methyl acetate, and ethyl formate which are included within the scope of the present invention, as exemplified by examples presented hereinafter, are capable of yielding asphaltene fractions of approximately the same physical properties as those produced by prior art methods such as that of obtaining asphaltenes described in application Serial No. 218,480, now U.S. Patent No. 2,783,188. For example, the percent yields and softening points of the fractions obtained by the method of the present invention are approximately the same as those obtained by the prior art methods. This is an important feature of the present invention since many of the present known applications of asphaltenes require the physical properties and characteristics of the asphaltenes obtained by these prior art methods. Another important feature is that each of the solvents may be used over a relatively wide temperature range to obtain approximately the same yield os asphaltenes having essentially the same physical properties and characteristics as those heretofore obtained by different processes. Because of this, some flexibility of operation is permitted providing the conditions selected are within the specified ranges.

The residual or petrolene fraction dissolved in the selected solvent may be separated from the solvent by flashing and thus produce a product having properties useful, for example, in the paint, varnish and enamel industries. If, however, it is desirable to recover separate fractions of oils and resins, it is possible that this may be done by increasing the prevailing temperature conditions of the petrolene fraction dissolved in the solvent. Such a technique has been described in application Serial No. 377,201, filed August 28, 1953, now abandoned in favor of copending application Serial No. 631,351, filed December 28, 1956, now abandoned.

In copending application Serial No. 631,351 and in a copending application filed in my name on or about February 19, 1959, for "Separation of Asphalt-Type Bituminous Materials," there is described a process scheme for continuous operation in the separation of an asphaltene fraction, a resin fraction, an asphaltene-resin fraction and an oil fraction from an asphalt-type bituminous material. Insofar as this processing scheme appertains to the separation of an asphaltene fraction, a resin fraction, an asphaltene-resin fraction, an oil fraction and the preparation of gasoline from the oil fraction, it is generally applicable to the present invention when employing esters containing a total of 2 to 3 carbon atoms, inclusive. As will be apparent to those skilled in the art, the process of the present invention is amenable to batch operation if desired.

The asphalt-type bituminous material used as feed for the process of the present invention should contain more than a trace amount and, preferably, a substantial amount of asphaltenes. For example, the asphaltene content should be at least sufficient to cause tower plugging when attempting to separate a high softening point fraction having a softening point of at least 300° F. following prior art practice. In most instances, at least about 1% asphaltenes should be present and, preferably, not less than about 5%. However, it should be remembered that tower plugging has been reported as occurring with some reduced crudes containing less than 1% asphaltenes during propane treatment and the present invention is equally effective in preventing tower plugging when the feed contains 1% or less asphaltenes.

It is not always necessary in accordance with the present invention to first distill off lighter fractions from crude before separation into desired fractions such as asphaltenes, resins, and oils. For example, Mississippi asphalt-type crude may be separated directly by the method of the invention into an asphaltene fraction and/or resin fraction, and an oil fraction which contains the lighter fractions such as gasoline, kerosene, gas oil, etc. The oil fraction thus obtained may be readily separated by distillation into the above mentioned lighter fractions and heavier oil fractions in their usual yields.

To further illustrate the flexibility of the invention and its suitability for processing asphaltic materials to produce various specialty products which were not available commercially heretofore, various special operations will be discussed. There has long been a demand for a powdered bituminous material exhibiting low granular cohesion of a type useful for building roads and other soil surface treatments usch as water-proofing banks of canals, etc. The only powdered asphaltic materials available commercially heretofore have been blown asphalts. Blown asphalts, instead of exhibiting the property of low granular cohesion, exhibit the property of high granular cohesion. For example, a blown asphalt when ground has the appearance of powdered graphite or magnetized iron filings since the particles tend to cohere instead of existing as separate and distinct particles.

The high granular cohesion type powdered bituminous materials are especially undesirable for treating sand to obtain a water impervious composition or mixture since cohesion of the particles aggravates the problem of obtaining intimate admixture with the sand. On the other hand, a low granular cohesion powdered bituminous material, such as is obtainable in accordance with the invention, may be readily and uniformly mixed with sand to obtain a water impervious mixture. Further, the intimate mixtures of sand and low granular cohesion bituminous materials exhibit the peculiar phenomenon of being non-water-wettable even when placed under a hydraulic head of water. Thus, operation of a plant in accordance with the teachings of the invention will produce in commercial quantities a material which has exceptional properties for cold treatment of soils to obtain surfaces which are essentially porous yet water-impervious and at a price that is competitive with blown asphalts.

A further advantage of the flexibility of the invention is illustrated by a method of making very high softening-point asphaltenes, i.e., in excess of 350° F. and simultaneously therewith producing an asphaltene-resin fraction which has low granular cohesion and improved pigment response. Such an asphaltene-resin fraction is very desirable for use in making colored asphalt tile products, as it may be easily incorporated with the tile composition and has relatively low pigment requirements. When operating in accordance with this embodiment of the invention, an asphaltene fraction is separated within about 50 to 65° F. below the critical temperature of the solvent. With methyl formate as the solvent, the temperature will be about 352 to 367° F. The yield of asphaltenes will vary from about 2% to 10% depending upon the nature of the charge and the softening point of the asphaltenes will vary from about 300° F. upward depending upon the solvent-to-charge ratio.

Under the above operating conditions, part of the asphaltenes may not be separated and further treatment at a temperature within 50° F. of the critical temperature of the solvent, i.e., about 467–417° F., will result in separation of a resin-asphaltene fraction having low granular cohesion and improved pigment response. The asphaltene-resin fraction separated under the above conditions has a softening point depending upon the specific temperature of separation, the charge and the solvent-to-charge ratio. The asphaltene-resin fraction will be essentially free of oil.

The material remaining in solution after the above treatment contains asphaltic oil and solvent. The temperature is adjusted to above the critical temperature and the pressure to less than the equilibrium pressure and the oil separates out and is recovered.

As the temperature approaches the upper temperature limit for the separation of asphaltenes, progressively lower percentages of asphaltenes are separated until at a temperature of about 50° F. below the critical temperature the yield of asphaltenes may be only 1 to 2%. This phenomenon permits the petroleum refiner to adjust the yield of products to meet changing market conditions. Thus, it may be expedient to operate a plant so as to produce only 1 or 2% or even less asphaltenes while producing a high yield of oil-free asphaltene-resin fraction having low granular cohesion and improved pigment response. It is especially desirable to operate in this manner when the demand for asphaltenes is low and the demand for the other products is exceptionally strong. When there is a need for catalytic cracker charge, a plant may be operated so as to produce a high yield of oil which may be used as feed to a catalytic cracker. Before the oil may be fed to a catalytic cracker, it is usually necessary to reduce the trace metals content to prevent poisoning the catalytic cracking catalyst. It has been discovered that reduction of sulfur and trace metals may be very economically achieved by processing oils produced in accordance with the invention in a conventional catalytic hydrofining unit prior to charging the oil to a catalytic cracker. During this operation, the oil fraction may be contacted with hydrogen gas at high temperature (700–800° F.) and pressure (600–800 p.s.i.g.) over a cobalt-molybdenum catalyst to remove detrimental impurities including sulfur, nitrogen, oxygen and metals. However, other methods for removing non-metallic substances such as sulfur or trace metals such as iron, vanadium and nickel may be used. Thus, by operating so as to produce low yields of asphaltenes, it is possible to produce special asphaltic type products not heretofore available commercially and simultaneously therewith obtain maximum yields of oil which may readily be converted into suitable catalytic cracker charge stock. Hence, a refiner operating a plant in accordance with the invention has greater freedom in the manner the asphaltic material is processed to produce asphaltenes, resins, asphaltene-resin fractions of 200–300° F. softening point, or oils suitable as charge stock for a catalytic cracker.

It has also been discovered that it is possible to operate so as to produce an asphaltene-resin fraction without producing a pure asphaltene fraction and thereby produce catalytic cracker charge stock much more economically than may be produced by coking asphalt. Not only is this type of operation more economical, but the yield of catalytic cracker charge is greater and the resulting gasoline is superior to the catalytic cracked gasoline obtained from a charge produced by coking asphalt to obtain coker gas oil.

To further illustrate the operation of a plant to produce an asphaltene-resin fraction of low granular cohesion and of about 200–300° F. softening point and a maximum yield of asphaltic oil suitable after hydrofining as a catalytic cracker charge stock, the solvent-asphalt mixture is treated within 50° F. of the critical temperature of the solvent. When the solvent is methyl formate, the temperature preferably should be about 380–410° F. and the pressure should be at least 25 p.s.i.g. above the equilibrium pressure of methyl formate at this temperature. The heavy fraction thus separated has a softening point of about 250 to 290° F. and is a mixture of asphaltenes and resins. Also, this asphaltene-resin fraction is substantially free of oil and is further characterized as having low granular cohesion. The residual material contains solvent, oil and soft resins. The asphaltic oil may have a Furol viscosity at 210° F. of from about 35 to 100 seconds. If the asphaltic oil contains some soft resins, the viscosity will be greater than 100 seconds Furol at 210° F. Often, mixtures of asphaltic oil and soft resins up to about 160 seconds Furol at 210° F. may be hydrofined to produce a catalytic cracker charge having catalyst poisoning properties low enough to be tolerated but the amount of hydrogen required to reduce the sulfur and metal content of such an asphaltic oil-soft resin mixture to a level tolerated in a catalytic cracker charge may become prohibitive.

Although esters containing a total of 2 to 3 carbon atoms, inclusive, are satisfactory for the purposes of the present invention, their homologue, ethyl acetate, is not. Thus, when ethyl acetate is used for the treatment of a 117° F. softening point, 87 penetration at 77° F. asphalt at temperatures and pressures in accordance with the present invention, there is no asphaltene separation but instead a complete solution of the entire asphalt sample. In other words, ethyl acetate has too high a solvent power for such an asphalt.

The following examples are for the purpose of illustration and are not limiting to the scope of the present invention which is set forth in the claims.

EXAMPLE I

The following tabulated data illustrates the separation of a 117° F. softening point, 87 penetration at 77° F. vacuum-reduced asphalt with methyl acetate using a solvent ratio of 10:1.

| Temp., ° F. | Press., p.s.i.g. | Asphaltene Fraction | | Resin-Oil Fraction | |
|---|---|---|---|---|---|
| | | Wt., Percent | Soft. Pt., ° F. | Wt., Percent | Soft. Pt., ° F. |
| 70 | 0 | 80.0 | 139 | 20.0 | too soft. |
| 250 | 90 | 31.4 | 305 | 68.6 | 83. |

Under conditions of atmospheric pressure and a temperature of 70° F. the separated phase of asphaltenes was an extremely viscous liquid classifiable as semi-solid. However, when employing a temperature of 250° F. and a pressure of 90 p.s.i.g. a liquid phase resulted and was easily removed from the equilibrium vessel.

EXAMPLE II

The following tabulated data illustrates the separation of a 117° F. softening point, 87 penetration at 77° F. vacuum-reduced asphalt with ethyl formate using a solvent ratio of 10:1.

| Temp., ° F. | Press., p.s.i.g. | Asphaltene Fraction | | Resin-Oil Fraction | |
|---|---|---|---|---|---|
| | | Wt., Percent | Soft. Pt., ° F. | Wt., Percent | Soft. Pt., ° F. |
| 70 | 0 | 61.7 | 177 | 38.3 | too soft. |
| 252 | 90 | 37.5 | 214 | 62.5 | 80. |
| 345 | 240 | 25.0 | 300 | 75.0 | 87. |

In the case of employing ethyl formate at room temperature and atmospheric pressure, the asphaltene phase separated was in the semi-solid state. However, in the other two runs which used elevated temperature and pressure conditions, both phases separated were liquid asphaltene phases and were easily withdrawn from the equilibrium vessel.

EXAMPLE III

The following tabulated data illustrates the separation of a 117° F. softening point, 87 penetration at 77° F. vacuum-reduced asphalt with methyl formate using a solvent ratio of 10:1.

| Temp., ° F. | Press., p.s.i.g. | Asphaltene Fraction | | Resin-Oil Fraction | |
|---|---|---|---|---|---|
| | | Wt., Percent | Soft. Pt., ° F. | Wt., Percent | Soft. Pt., ° F. |
| 70 | 0 | 90.2 | 132.5 | 9.8 | too soft. |
| 250 | 185 | 44.9 | 247 | 55.1 | 73.5. |
| 325 | 390 | 32.3 | 336 | 67.7 | 74.5. |

When employing methyl formate at 70° F. and atmospheric pressure the phase separated was a semi-solid asphaltene phase. However, in the other two runs which use elevated temperature and pressure conditions, both phases separated were liquid asphaltene phases and were easily withdrawn from the equilibrium vessel.

EXAMPLE IV

The resin-oil fraction obtained in Example I when operating at a temperature of 250° F. and a pressure of 90 p.s.i.g. was subjected to increased pressure and temperature conditions employing methyl acetate as the solvent and a solvent to resin-oil ratio of 10:1. The temperature of treatment was 410° F. and the pressure was substantially above the equilibrium pressure at this temperature. Separate resin and oil fractions were obtained as follows:

|  | Resins | Oils |
|---|---|---|
| Yield, Wt. Percent | 32.4 | 67.6 |
| Soft. Pt., °F | 158 | too soft |

After removal of the liquid resin phase, the asphaltic oils were recovered from the solvent solution by flashing.

EXAMPLE V

An asphalt having a softening point of 115° F. was treated with 10 volumes of methyl formate at a temperature of 390° F. to separate a 45 volume percent yield of an ashphaltene-resin fraction having a softening point of about 220° F. The pressure was about 100 lbs. above the equilibrium pressure of the solvent at the temperature of treatment. The resulting asphaltene-resin fraction was withdrawn and the solvent recovered from the remaining solvent solution to obtain an asphaltic oil fraction in a 55 volume percent yield. The asphaltic oil fraction was treated with hydrogen at 700° F. and 800 p.s.i.g. to give a 100 volume percent yield of material shown as the "after hydrofining" product of Table I below. This material was distilled to remove 25 volume percent of light product boiling up to 650° F. and the remaining 75 volume percent was catalytically cracked at 950° F. to produce gasoline in 50 volume percent yield based on the charge to the catalytic cracker.

Table I below gives typical test data on an asphaltic oil of the invention before and after hydrofining to convert it into a satisfactory catalytic cracker charge stock.

*Table I*

| Test | Asphaltic Oil | |
|---|---|---|
|  | Before Hydrofining | After Hydrofining |
| °API | 17.0 | 23.9 |
| Sulfur, wt. percent | 1.32 | 0.57 |
| Viscosity, Furol Sec. at 210° F | 45.7 | 3.5 |
| UOPK | 11.90 | 11.85 |
| Distillation, Vacuum (corr.) °F.: | | |
| 10% | 910 | 391 |
| 30% | 995 | 681 |
| 50% |  | 891 |
| Hydrogen consumed, s.c.f./b |  | 322 |

| Test | Metal Analysis, p.p.m. | |
|---|---|---|
|  | Before Hydrofining | After Hydrofining |
| Ash | 96 | 37 |
| Fe | .06 | 0.05 |
| Ni | 20 | 7.3 |
| V | 36 | 15.5 |

What is claimed is:

1. A method of separating an asphalt-type bituminous material including asphaltenes into at least two fractions which comprises treating each volume of the asphalt-type bituminous material with at least two volumes of a solvent consisting essentially of at least one aliphatic carboxylic acid ester containing from 2 through 3 carbon atoms, inclusive, and admixtures thereof at elevated temperature and pressure to form a heavy fluid phase asphaltene fraction and a lighter solvent fraction containing dissolved residual asphalt-type bituminous material, the temperature of treatment being between about 50° F. below the critical temperature of the solvent and about 200° F. and the pressure being at least equal to the vapor pressure of the solvent at the temperature selected, and separating the resulting heavy fluid phase asphaltene fraction while in the fluid phase from the lighter solvent fraction containing dissolved residual asphalt-type bituminous material.

2. A method of separating an asphalt-type bituminous material including asphaltenes into at least two fractions which comprises treating each volume of the asphalt-type bituminous material with at least four volumes of a solvent consisting essentially of at least one aliphatic carboxylic acid ester containing from 2 through 3 carbon atoms, inclusive, and admixtures thereof at elevated temperature and pressure to form a heavy fluid phase asphaltene fraction and a lighter solvent fraction containing dissolved residual asphalt-type bituminous material. the temperature of treatment being between about 50° F. below the critical temperature of the solvent and about 200° F. and the pressure being at least equal to the vapor pressure of the solvent at the temperature selected, and separating the resulting heavy fluid phase asphaltene fraction while in the fluid phase from the lighter solvent fraction containing dissolved residual asphalt-type bituminous material.

3. A method of separating an asphalt-type bituminous material including asphaltenes into at least two fractions which comprises treating each volume of the asphalt-type bituminous material with at least two volumes of a solvent consisting essentially of at least one aliphatic carboxylic acid ester containing from 2 through 3 carbon atoms, inclusive, and admixtures thereof at elevated temperature and pressure to form a heavy fluid phase asphaltene fraction and a lighter solvent fraction containing dissolved residual asphalt-type bituminous material, the temperature of treatment being between about 50° F. below the critical temperature of the solvent and about 200° F. and the pressure being at least equal to the vapor pressure of the solvent at the temperature selected, separating the resulting heavy fluid phase asphaltene fraction while in the fluid phase from the lighter solvent fraction containing dissolved residual asphalt-type bituminous material, and then increasing the temperature of the lighter solvent fraction containing dissolved residual asphalt-type bituminous material to a temperature above the equilibrium temperature of the solvent at the prevailing pressure to separate solvent.

4. A method of separating an asphalt-type bituminous material including asphaltenes into at least two fractions which comprises treating each volume of the asphalt-type bituminous material with at least two volumes of a solvent consisting essentially of methyl formate at elevated temperature and pressure to form a heavy fluid phase asphaltene fraction and a lighter solvent fraction containing dissolved residual asphalt-type bituminous material, the temperature of treatment being between about 50° F. below the critical temperature of the solvent and about 200° F. and the pressure being at least equal to the vapor pressure of the solvent at the temperature selected, and separating the resulting heavy fluid phase asphaltene fraction while in the fluid phase from the lighter solvent fraction containing dissolved residual asphalt-type bituminous material.

5. A method of separating an asphalt-type bituminous material including asphaltenes into at least two fractions which comprises treating each volume of the asphalt-type bituminous material with at least two volumes of a solvent consisting essentially of methyl formate at elevated temperature and pressure to form a heavy fluid phase asphaltene fraction and a lighter solvent fraction containing dissolved residual asphalt-type bituminous material, the temperature of treatment being between about 50° F. below the critical temperature of the solvent and about 200° F. and the pressure being at least equal to the vapor pressure of the solvent at the temperature selected, separating the resulting heavy fluid phase asphaltene fraction while in the fluid phase from the lighter solvent fraction containing dissolved residual asphalt-type bituminous material, and then increasing the temperature of the lighter solvent fraction containing dissolved residual asphalt-type bituminous material to a temperature above the equilibrium temperature of the solvent at the prevailing pressure to separate solvent.

6. A method of separating an asphalt-type bituminous material including asphaltenes into at least two fractions which comprises treating each volume of the asphalt-type bituminous material with at least two volumes of a solvent consisting essentially of methyl acetate at elevated temperature and pressure to form a heavy fluid phase asphaltene fraction and a lighter solvent fraction containing dissolved residual asphalt-type bituminous material, the temperature of treatment being between about 50° F. below the critical temperature of the solvent and about 200° F. and the pressure being at least equal to the vapor pressure of the solvent at the temperature selected, and separating the resulting heavy fluid phase asphaltene fraction while in the fluid phase from the lighter solvent fraction containing dissolved residual asphalt-type bituminous material.

7. A method of separating an asphalt-type bituminous material including asphaltenes into at least two fractions which comprises treating each volume of the asphalt-type bituminous material with at least two volumes of a solvent consisting essentially of methyl acetate at elevated temperature and pressure to form a heavy fluid phase asphaltene fraction and a lighter solvent fraction containing dissolved residual asphalt-type bituminous material, the temperature of treatment being between about 50° F. below the critical temperature of the solvent and about 200° F. and the pressure being at least equal to the vapor pressure of the solvent at the temperature selected, separating the resulting heavy fluid phase asphaltene fraction while in the fluid phase from the lighter solvent fraction containing dissolved residual asphalt-type bituminous material, and then increasing the temperature of the lighter solvent fraction containing dissolved residual asphalt-type bituminous material to a temperature above the equilibrium temperature of the solvent at the prevailing pressure to separate solvent.

8. A method of separating an asphalt-type bituminous material including asphaltenes into at least two fractions which comprises treating each volume of the asphalt-type bituminous material with at least two volumes of a solvent consisting essentially of ethyl formate at elevated temperature and pressure to form a heavy fluid phase asphaltene fraction and a lighter solvent fraction containing dissolved residual asphalt-type bituminous material, the temperature of treatment being between about 50° F. below the critical temperature of the solvent and about 200° F. and the pressure being at least equal to the vapor pressure of the solvent at the temperature selected, and separating the resulting heavy fluid phase asphaltene fraction while in the fluid phase from the lighter solvent fraction containing dissolved residual asphalt-type bituminous material.

9. A method of separating an asphalt-type bituminous material including asphaltenes into at least two fractions which comprises treating each volume of the asphalt-type bituminous material with at least two volumes of a solvent consisting essentially of ethyl formate at elevated temperature and pressure to form a heavy fluid phase asphaltene fraction and a lighter solvent fraction containing dissolved residual asphalt-type bituminous material, the temperature of treatment being between about 50° F. below the critical temperature of the solvent and about 200° F. and the pressure being at least equal to the vapor pressure of the solvent at the temperature selected, separating the resulting heavy fluid phase asphaltene fraction while in the fluid phase from the lighter solvent fraction containing dissolved residual asphalt-type bituminous material, and then increasing the temperature of the lighter solvent fraction containing dissolved residual asphalt-type bituminous material to a temperature above the equilibrium temperature of the solvent at the prevailing pressure to separate solvent.

10. A method of separating an asphalt-type bituminous material including asphaltenes into at least two fractions which comprises treating each volume of the asphalt-type bituminous material with at least two volumes of a solvent consisting essentially of at least one aliphatic carboxylic acid ester containing from 2 through 3 carbon atoms, inclusive, and admixtures thereof at elevated temperature and pressure to form a heavy fluid phase asphaltene fraction and a lighter solvent fraction containing dissolved residual asphalt-type bituminous material, the temperature of treatment being between about 50° F. below the critical temperature of the solvent and about 200° F. and the pressure being at least equal to the vapor pressure of the solvent at the temperature selected, separating the resulting heavy fluid phase asphaltene fraction while in the fluid phase from the lighter solvent fraction containing dissolved residual asphalt-type bituminous material, separating a fraction of residual asphalt-type bituminous material from a lighter solvent fraction containing oils by treating the lighter solvent fraction containing dissolved residual asphalt-type bituminous material in a treating zone under further elevated temperature and pressure conditions, the temperature of this treatment being greater than 50° F. below the critical temperature of the solvent and the pressure being at least equal to the vapor pressure of the solvent at temperatures up to the critical temperature and sufficient to maintain liquid phase conditions at the highest temperature present in the treating zone, the separated fraction of residual asphalt-type bituminous material being in the fluid phase and having a viscosity whereby it is freely flowable from the treating zone, and withdrawing the fluid phase fraction of residual asphalt-type bituminous material from the treating zone.

11. The method of claim 10 wherein after separation of the fraction of residual asphalt-type bituminous material the temperature of the remaining lighter solvent fraction containing oils is increased to above the equilibrium temperature of the solvent at the prevailing pressure to separate solvent.

12. The method of claim 10 wherein after separation of the fraction of residual asphalt-type bituminous material oils present in the lighter solvent fraction containing oils are passed to a process for producing gasoline therefrom which includes a cracking step.

13. The method of claim 10 wherein each volume of the asphalt-type bituminous material is treated with at least four volumes of solvent.

14. A method of separating an asphalt-type bituminous material including asphaltenes into at least two fractions which comprises treating each volume of the asphalt-type bituminous material with at least two volumes of a solvent consisting essentially of at least one aliphatic carboxylic acid ester containing from 2 through 3 carbon atoms, inclusive, and admixtures thereof at elevated temperature and pressure to form a heavy fluid phase asphaltene-resin fraction and a lighter solvent fraction containing dissolved residual asphalt-type bituminous material including oils, the temperature of treatment being greater than 50° F. below the critical temperature of the solvent and the pressure being at least equal to the vapor pressure of the solvent at temperatures up to the critical temperature and sufficient to maintain liquid phase conditions at the highest temperature in the treating zone, the separated substantially asphaltic oil-free asphaltene-resin fraction being in the fluid phase and having a viscosity whereby it is freely flowable from the treating zone, and withdrawing the fluid phase asphaltene-resin fraction from the treating zone.

15. The method of claim 14 wherein oils present in the lighter solvent fraction containing dissolved residual asphalt-type bituminous material including oils are passed to a process for producing gasoline therefrom which includes a cracking step.

16. The method of claim 14 wherein each volume of the asphalt-type bituminous material is treated with at least four volumes of solvent.

17. The method of claim 14 wherein the temperature of the lighter solvent fraction containing dissolved residual asphalt-type bituminous material including oils is increased to above the equilibrium temperature of the solvent at the prevailing pressure to separate solvent.

References Cited in the file of this patent

UNITED STATES PATENTS

| | | |
|---|---|---|
| 2,115,003 | Beiswenger | Apr. 26, 1938 |
| 2,131,205 | Wells et al. | Sept. 27, 1938 |
| 2,148,716 | Whiteley et al. | Feb. 28, 1940 |
| 2,202,389 | Lewis et al. | May 28, 1940 |
| 2,894,904 | Hardman et al. | July 14, 1959 |

FOREIGN PATENTS

| | | |
|---|---|---|
| 464,175 | Great Britain | Apr. 3, 1937 |